United States Patent

[11] 3,534,662

[72] Inventor Giorgio Eggstein
   Torino, Italy
[21] Appl. No. 689,844
[22] Filed Dec. 12, 1967
[45] Patented Oct. 20, 1970
[73] Assignee Ernst Heinkel Aktiengesellschaft
   Stuttgart-Zuffenhausen, Germany
[32] Priority Dec. 17, 1966
[33] Germany
[31] H 61,322

[54] POWER BRAKE ARRANGEMENT
   6 Claims, 5 Drawing Figs.
[52] U.S. Cl. .................................................. 91/434,
   92/75, 92/100
[51] Int. Cl. ........................................F15b 13/14,
   F16j 3/00
[50] Field of Search........................................... 91/370,
   371, 372, 377, 434

[56] References Cited
   UNITED STATES PATENTS
| | | | |
|---|---|---|---|
| 2,826,042 | 3/1958 | Rike et al. | 91/372 |
| 2,880,704 | 4/1959 | Price | 91/372 |
| 3,016,880 | 1/1962 | Kellogg et al. | 91/372 |
| 3,057,332 | 10/1962 | Kellogg et al. | 91/372 |
| 3,075,499 | 1/1963 | Prather | 91/434 |
| 3,155,012 | 11/1964 | Ayers | 91/434 |

Primary Examiner—Paul E. Maslousky
Attorney—Michael S. Striker

ABSTRACT: A pneumatic booster motor has a cylinder connected with a source of negative pressure, and being divided by a flexible membrane supporting a power piston connected with brakes, and a reaction piston connected with a valve operated by the brake pedal to admit atmospheric air into the cylinder so that pressure differentials on opposite sides of the pistons urge the same apart and effect operation of the brakes by the power piston, and exertion of a reaction force by the reaction piston on the brake pedal so that the actually applied brake force is indicated to the operator.

Patented Oct. 20, 1970

INVENTOR

BY

ATTORNEYS

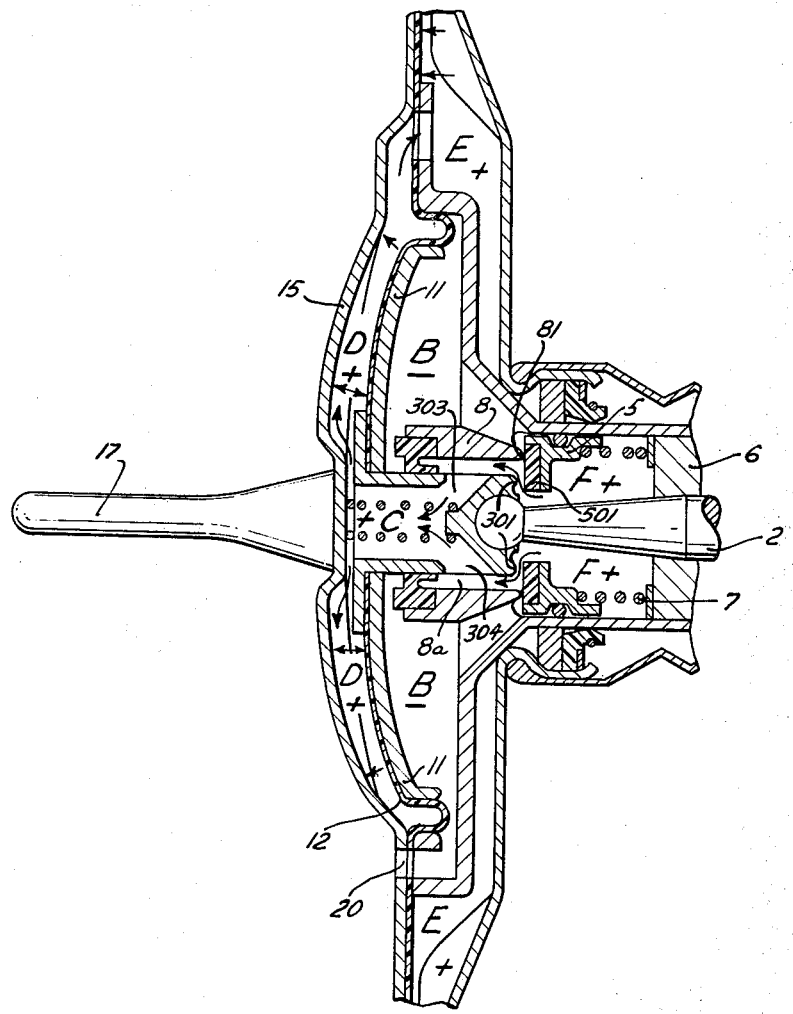

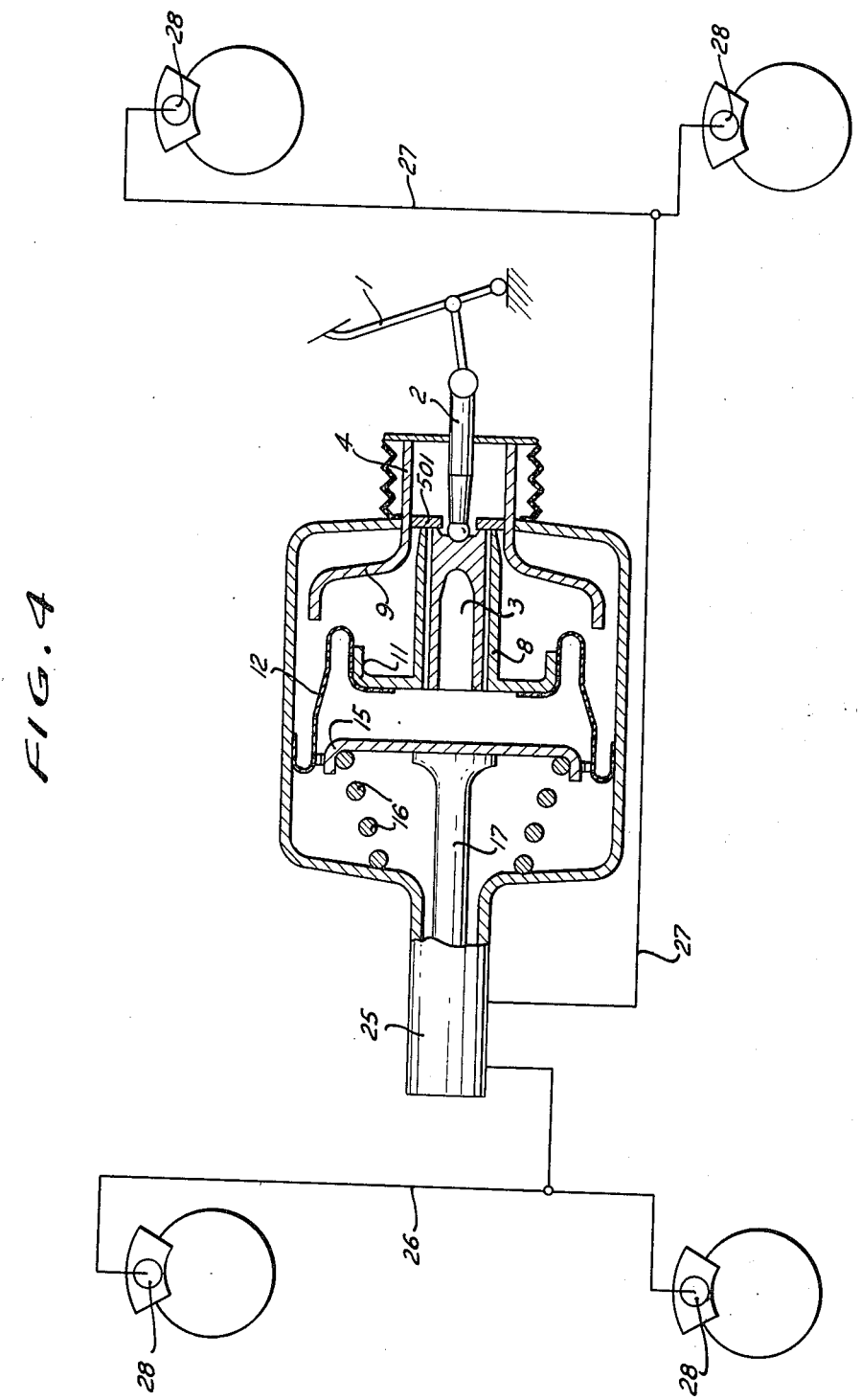

POWER BRAKE ARRANGEMENT

BACKGROUND OF THE INVENTION

The present invention relates to a power brake arrangement with a pneumatic or hydraulic booster servo motor which exerts a great force on the brakes when the brake pedal is actuated by an operator with a substantially smaller force.

It is known to provide power brake arrangements for motor cars with means by which the actually applied brake force is indicated to the driver by a reaction force acting on the brake pedal. If the applied brake force would have no influence on the brake pedal, the driver could not feel the amount of the applied brake force, but would have to rely on the observation of the slowing down of the car to determine whether further pressure on the brake pedal is required, or whether the braking was too sudden. It may also happen that such a great brake force is produced by the booster motor that the wheels are blocked and the car skids. The indication of the brake force on the brake pedal is preferably obtained by means forming part of the booster servo motor. This has the advantage that no additional space is required, as compared with arrangements in which the indication of the applied brake force is obtained at the brake pedal by parts of a hydraulic brake system.

Power brake arrangements according to the prior art have the disadvantage that the reaction force does not immediately act on the brake pedal, but only becomes effective after the booster servo motor has already applied a substantial brake force. Consequently, the brake force is rapidly increased upon operation of the brake pedal, without any indication to the driver since the brake pedal freely moves during the first part of the brake action. This may cause the driver to apply a greater force to the brake pedal, so that the brake force applied by the booster servo motor becomes so great that the wheels are blocked, the car is stopped too suddenly, and the passengers are thrown forward.

In known power brake arrangements, elastic parts transmit to the brake pedal the force representing the applied brake force. Consequently, there is no functional correlation between the muscular force applied by the driver, and the actual brake effect. The resistance which the driver feels at the brake pedal, is not a true function of the applied brake force.

Another disadvantage of known power brake arrangements is that the time period between the start of the actuation of the brake pedal and the application of the maximum braking force is comparatively great, for example 300 milliseconds, and a minimum of 280 mm./sec. At high throughway speeds, the car moves two or three car lengths after actuation of the brake pedal and before the brake action takes place.

SUMMARY OF THE INVENTION

It is one object of the invention to overcome the disadvantages of known power brake arrangements, and to provide a power brake arrangement which is practically immediately effective when the brake pedal is actuated, and which produces a reaction force acting on the brake pedal to provide a clear indication of the brake force applied by the booster servo motor.

Another object of the invention is to provide a power brake arrangement in which upon application of a brake force, a proportionally smaller reaction force is exerted on the brake pedal so that the resistance of the brake pedal opposing further movement by the driver is a measure of the brake force by which the car is slowed down.

With these objects in view, the present invention relates to a power brake arrangement which produces on the brake pedal a reaction force proportional to the brake force applied by the booster servo motor. In accordance with the invention, the brake pedal acts on a valve member displacing a reaction piston which is freely movable relative to a power piston connected with the hydraulic brakes of the car. The operation of the valve member produces a differential pressure by which the power piston and the reaction piston are simultaneously operated so that the reaction piston exerts pressure on the brake pedal opposing its movement, while the power piston actuates the brakes.

One embodiment of the invention comprises a power piston and a reaction piston located in a cylinder which is connected with suction generating means, such as the intake manifold of a motor. The power piston divides the cylinder into a first negative pressure chamber communicating with the suction generating means, and into a cylinder space. The reaction piston is located in the cylinder space and forms with the power piston a variable pressure chamber and with the cylinder a second negative pressure chamber also communicating with the suction generating means through the first negative pressure chamber.

An operator controlled valve member, for example connected with the brake pedal, is fixedly connected with the reaction piston and can be moved by an operator to an open position for connecting the variable pressure chamber with atmospheric air. Consequently, when the operator steps on the brake pedal, the atmospheric pressure exerts on the power piston a force so that the brakes are operated, and exerts on the reaction piston a reaction force acting on the valve member and brake pedal opposite to the direction in which the brake pedal is actuated. The reaction force is proportional to the brake force so that the operator receives an indication of the actual brake force.

In the preferred embodiment of the invention, the power piston has a greater diameter than the reaction piston, and a single flexible membrane has an outer annular portion for fluid-tightly and movably connecting the power piston with the cylinder, and an inner annular portion for fluid-tightly and movably mounting the reaction piston on a circular wall within the cylinder. The circular wall forms with the reaction piston a chamber in which negative pressure prevails, and forms with the end wall of the cylinder, and the outer annular portion of the power piston, another variable pressure chamber communicating with the variable pressure chamber between the power piston and the reaction piston.

Preferably, a spring is provided between the valve member and reaction piston on one hand, and the power piston on the other hand, so that upon failure of the booster servo motor, the valve member, operated by the brake pedal compresses the spring until the unit formed by the valve member and the reaction piston abuts the power piston, permitting the operator to move the power piston and to actuate the brakes by foot pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a fragmentary axial sectional view illustrating part of the embodiment of FIG. 1 in a third operational position after further depression of the brake pedal;

FIG. 4 is a schematic view, partially in section, illustrating the power brake arrangement of the present invention.

DESCRIPTION OF THE PREFERRED EMBODIMENT

Figure 1:
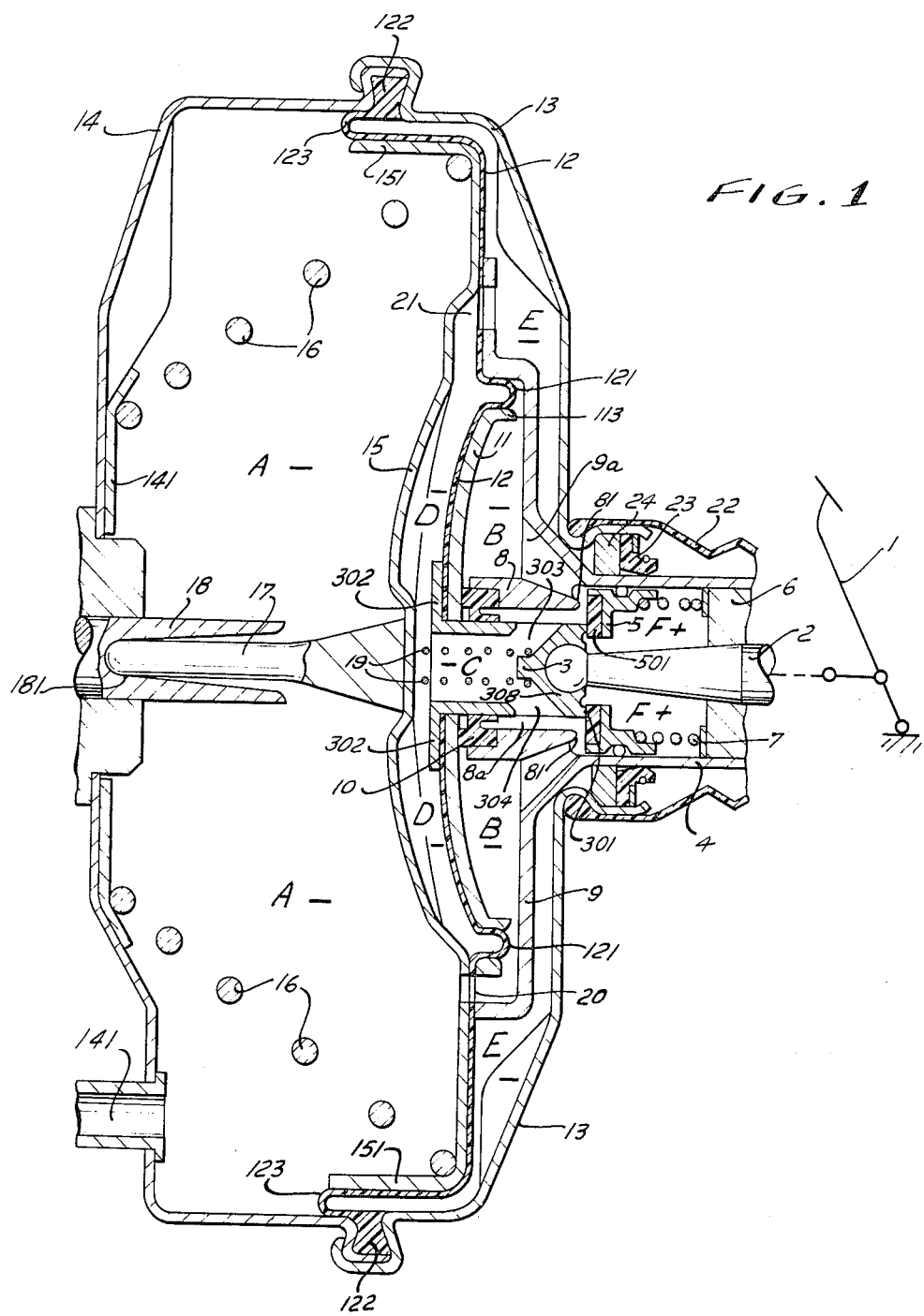
FIG. 1 is an axial sectional view illustrating a pneumatic booster servo motor according to the invention in a normal inoperative position.

A casing of substantially cylindrical configuration has two parts 13 and 14 connected by a circumferential crimped bead in which an annular peripheral rim 122 of a membrane 11 is fluid-tightly clamped. Membrane 12 has an outer annular portion secured to a power piston 15 along an annular outer portion of the same which includes a cylindrical part 151. A circumferential fold 123 is formed by the membrane so that power piston 15 is supported for axial movement in the cylinder means formed by casing 12, 13. A frustoconical spring 16 abuts power piston 15 and urges the same toward the right as viewed in the drawing. A connecting member 17 is secured to the center portion of power piston 15 and has a portion projecting into a recess 181 of the end of a piston rod 18 which is secured to the master piston in the master cylinder 25 of the brake system of a motor car. As shown in FIG. 4, the master cylinder 25 is connected by lines 26 and 27 to four brake cylinders 28 by which brake pistons acting on a brake disc are operated when the pressure in the master cylinder 25 is increased by movement of master piston 18 under the control of power piston 15.

Power piston 15 forms in the cylinder means of casing 13, 14, two cylinder spaces. The space A is connected to the manifold of the combustion engine of the motor car provided with the brake system, so that the suction generating parts of the engine produce a negative pressure in space A so that the same constitutes a negative pressure chamber. A wall 9 of the cylinder means is located in the casing portion 13 and has a tubular cylindrical part 4 which is fixedly connected with a valve housing 8 having a circular valve seat 81. A valve member 3 is mounted in valve housing 8 for axial movement and has a portion 308 formed with a socket receiving a spherical portion of a member 2 which is connected with the brake pedal 1 by force transmitting means only schematically indicated in the drawing. A spring 19 abuts the center portion of power piston 15 and portion 303 of valve member 3 and urges valve member 3 toward the right as viewed in the drawing so that the circular valve seat 301 on valve part 308 abuts a sealing ring 501 on a circular valve element 5 which is slidable in the tubular portion 4 and is biased by a spring 7 abutting a filter 6 to move toward the left as viewed in FIG. 1. A chamber F communicating with the atmosphere through through filter 6 is separated in the inoperative position shown in FIG. 1 from the interior casing means 13, 14 due to the engagement between sealing ring 501 and valve seat 301.

The other end of valve member 3 has a flange 302 secured to the central portion of a reaction piston 11 and to a central portion of membrane 12. An annular fold 121 of membrane 12 is secured to the periphery of wall means 9 so that reaction piston 12 can move in axial direction with the annular fold 121 rolling on a flange 113. Spring 19 urges valve member 3 and thereby reaction piston 11 to a position in which reaction piston 11 abuts an annular resilient ring 10 mounted on the valve housing 8 and being slidingly engaged by valve member 3, while acting as a buffer for reaction piston 11.

The cylinder space formed on the right side of power piston 15 is divided by reaction piston 11 and wall 9. A variable pressure chamber D is formed between power piston 15 and reaction piston 12. Another variable pressure chamber E communicating with variable pressure chamber D through a passage 21 in membrane 12 and wall means 9, is formed between the stationary wall 13 and 9 on one hand, and the outer annular portion of power piston 15 on the other hand. A second negative pressure chamber B is formed between reaction piston 11 and wall 9, and communicates through passages 9a in wall 9, and passages 8a in valve housing 8 with an inner variable pressure chamber C which has inlets 303 and 304 and communicates in the normal inoperative position shown in FIG. 1 with the variable pressure chamber D. A flange portion of casing part 13 is provided for attaching a flexible tube 22 having accordion pleats, and sealing rings 24 and 23 between this flange and the tubular part 4 of wall means 9 are provided for obtaining a perfect sealing of the variable pressure chamber E.

The negative pressure chamber B communicates with the negative pressure chamber A through a passage 20 passing through membrane 12, power piston 15 and a flange of wall means 9. A plurality of passages 20 and 21 is advantageously provided.

In the normal inoperative position of the apparatus, in which the driver or operator does not apply pressure to the brake pedal 1, the apparatus is in the position illustrated in FIG. 1. Suction is applied to the opening in member 141 so that negative pressure, indicated by a minus sign, prevails in suction chamber A and also in suction chamber B since the two suction chambers communicate through passages 20. Suction chamber B communicates through passages 9a, 8a, 303, 304 with the space C in valve member 3 so that negative pressure also prevails in chamber C and in the variable pressure chambers D and E which communicate through passages 21. Atmospheric pressure prevails in chamber F, as indicated by a plus sign, but no atmospheric air can flow into the cylinder means formed by casing means 9, 13 and 14, since springs 19 and 7 urge valve seat 301 and sealing ring 501 into sealing engagement.

Figure 2:
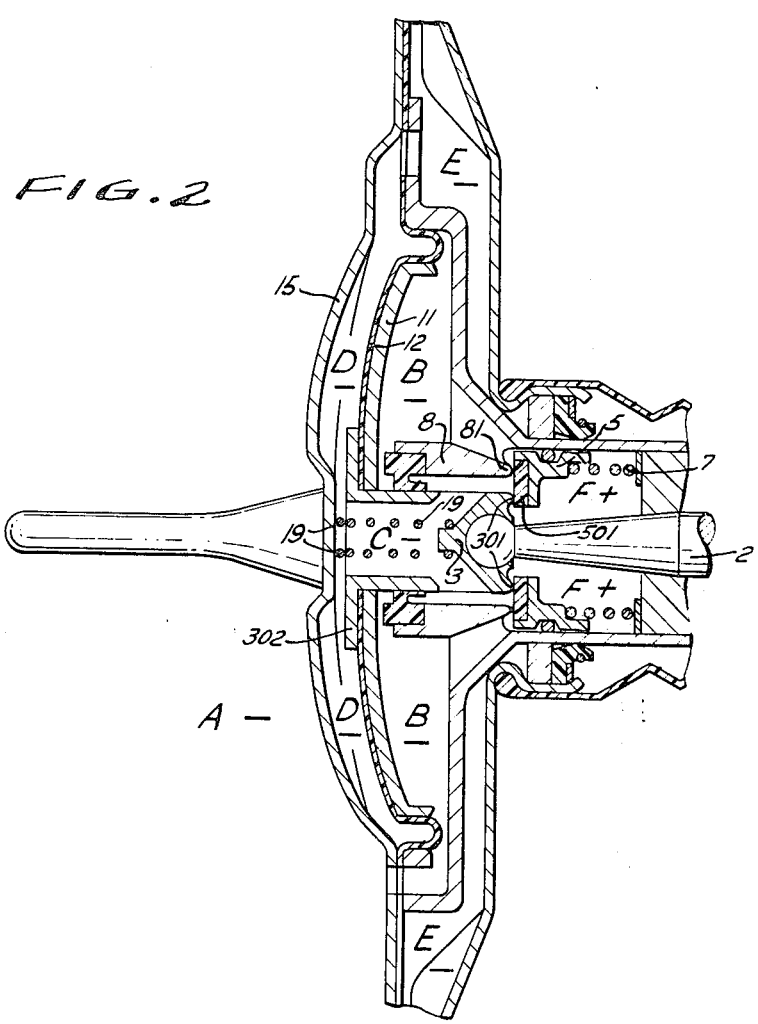
FIG. 2 is a fragmentary axial sectional view illustrating a part of the embodiment of FIG. 1 in a second operational position after actuation of the brake pedal.

When the operator presses brake pedal 1 slightly down, the valve means assume the position shown in FIG. 2. Valve member 3 moves to the left against the action of spring 19, but valve element 5, 501 follows valve seat 301 due to the action of spring 7 until sealing ring 501 abuts the stationary valve seat 81 on valve housing 8, as shown in FIG. 2.

In this position, the communication between the negative pressure chamber B and valve chamber C is interrupted, so that two chamber systems A, B and C, D, E are formed. However, negative pressure still prevails in chambers A to E, as indicated by minus signs in FIG. 2.

When the operator further depresses brake pedal 1, the parts of the apparatus assume the position shown in FIG. 3. Member 2, actuated by the brake pedal 1, moves valve member 3 farther to the left, together with reaction piston 11. Valve element 5, 501 cannot follow this movement under the action of spring 7 since it is blocked by stationary valve housing 8, abutting valve seat 81.

Atmospheric air in chamber F and entering the same through filter 6, flows through the annular passage between sealing ring 501 and valve seat 301, passages 8a, and passages 303, 304 into valve chamber C and from there into variable pressure chamber D and variable pressure chamber E. Consequently, atmospheric pressure prevails in chambers C, D, E and F, as indicated by plus signs in FIG. 3, and negative pressure prevails in chambers A and B as indicated by minus signs. The engagement of stationary valve seat 81 by valve element 5, 501 prevents any communication between the chambers in which positive and negative pressure prevails, respectively.

The pressure on the right of power piston 15 is greater than the pressure on the left of the same, and the pressure on the left of reaction piston 11 is greater than the pressure on the right of the same. Consequently, the pressure differential moves power piston 15 to the left, see also FIG. 4, so that the master piston in master cylinder 25 is displaced and brake fluid is pressed into brake cylinders 28 to operate the hydraulic brakes of the car. Since atmospheric pressure prevails in the variable pressure chambers D and E, the entire power piston is subjected to a differential pressure, and a great force acts on the brakes.

The diameter and surface of reaction piston 11 is smaller than the diameter and surface of power piston 15, and only the pressure differential between chambers D and B acts on reaction piston 11 to urge valve member 3, connecting means 2, and brake pedal 1 to the right as viewed in FIG. 1 so that the operator feels a reaction force which indicates that a brake force is applied to the wheels, but is smaller than the force applied by power piston 15 to the brake means.

The reaction force acting on brake pedal 1 and on the operator controlled valve member 3 is always in a predetermined linear ratio to the effective brake pressure, and depends on the effective surfaces of power piston 15 and reaction piston 11, on the forces of springs 16 and 19, on friction losses, and on the mechanical transmission ratio of the effective lever arm of brake pedal 1.

When the brake pedal 1 is released by the operator, reaction piston 11 and spring 19 urge valve member 3 to move to the right until valve seat 301 engages valve element 5, 501 which is moved against the action of spring 7 to the position of FIG. 1 in which communication between negative pressure chamber B and variable pressure chamber D is established by valve chamber C so that negative pressure is produced in all chambers. When reaction piston 11 reaches its end position, it abuts the annular buffer and sealing ring 10 and is stopped by the same.

Since the pressure differential between negative pressure chamber A and variable pressure chamber D on opposite sides of power piston 15 is eliminated, spring 18 urges power piston 15 to its initial position shown in FIG. 1.

Assuming that the diameter of power piston 15, measured at the annular folds 123 is $D_a$, that the diameter of the reaction piston 12, measured at the annular fold 121 is $D_r$, that the diameter of the valve chamber C is $D_r$, and assuming $n$ passages 20, each of which has the diameter $d_a$, the following effective piston areas can be calculated:

$$P = \frac{\pi}{4}(D_a^2 - nd_a^2)$$

$$R = \frac{\pi}{4}(D_r^2 - d_v^2)$$

Assuming that the pressure differential between atmospheric pressure and the negative pressure generated by the manifold of the combustion engine is $P_{diff}$, a brake force $$F_b = \frac{\pi}{4}(D_a^2 - nd_a^2)P_{diff}$$

and a reaction force $$F_r = \frac{\pi}{4}(D_r^2 - d_v^2)P_{diff}$$

can be calculated.

The brake force $F_b$ is reduced by the spring force $f_{16}$ of spring 16 and increased by one-half of the spring force $f_{19}$ of spring 19, the other half of spring force $f_{19}$ increasing the reaction force.

The reaction force $F_r$ acts on a lever system between brake pedal 1 and member 2. The ratio of this transmission is $S_p:S_s$ wherein $S_p$ refers to the brake pedal, and $S_s$ refers to brake member 2.

If the friction losses are disregarded, the brake force acting on master piston 18 can be expressed by the following equation:

$$F_b(\text{kg.}) = \frac{\pi}{4}(D_a^2 - d_a^2)(\text{cm.}^2)P_{diff}(\text{kg./cm.}^2)$$
$$-f_{16} + \frac{f_{19}}{2}(\text{kg.})$$

The reaction force acting on the foot of the driver can be expressed by the following equations:

$$f_r = F_r \frac{S_s}{S_p}$$

$$f_r(\text{kg.}) = \frac{\pi}{4}\frac{S_s}{S_p}(D_r^2 - d_v^2)P_{diff} - \frac{f_{19}}{2}$$

Since the expressions $$\frac{\pi}{4}(D_a^2 - d_a^2)$$

and $$\frac{\pi}{4}(D_r^2 - d_v^2)$$

are constants representing the effective areas of power piston 15 and reaction piston 11, and disregarding the small spring forces $f_{16}$ and $f_{19}$, it is evident that the brake force and the reaction force are in a linear ratio, which may be expressed as follows:

$$\frac{F_b}{f_r}$$

The spring forces have no influence since the ratios $f_{16} : F_b$ and $f_{19} : 2F_r$, are small and have practically no effect on the ratio $F_b : f_r$. If the ratio R : P and the ratio $S_s : S_p$ are properly selected, the ratio $F_b : f_r$ may be held almost mathematically constant.

The following data of a preferred embodiment are given by way of example, and are not limiting in any way.

Assuming $D_a$ to be 200 mm., $D_r$ to be 140 mm., $dv$ to be 15 mm. $n$ to be 8, $d_a$ to be 10 mm., $S_p : S_s$ to be 4:1, $P_{diff}$ to be 0.7 kg./cm.$^2$, $f_{16}$ to be 16 kg. and $f_{19}$ to be 12 kg., a maximum booster force of $F_b$ of 206 kg., and the maximum reaction force $F_r$ of 102 kg. results, so that the force $f_r$ acting on the foot of the driver is 26 kg. which means that the used muscle power is amplified in the ratio of 1:7.9 in accordance with a linear function.

Figure 5:
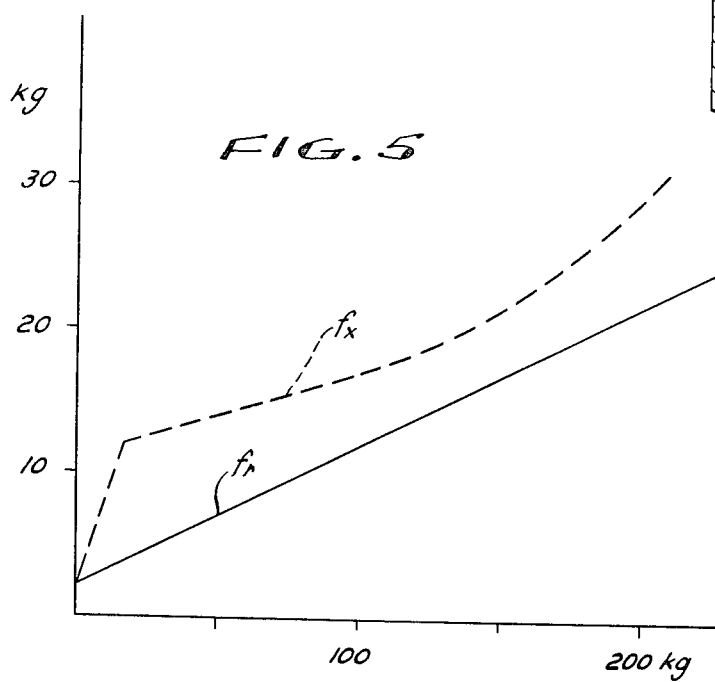
FIG. 5 is a diagram graphically illustrating the counterpressures acting on the brake pedal of a known power brake arrangement and of the present invention, depending on the applied brake force.

FIG. 5 shows the reaction force $f_r$ acting on the brake pedal in the construction of the present invention, and the reaction force $f_x$ acting on the brake pedal in accordance with a prior art construction, depending on the brake force applied by the power piston. The reaction force $f_r$ is represented by a straight line indicating a strictly linear function, whereas the reaction force $f_x$ indicates at first the application of a great brake force, which is not really applied, and then rises in accordance with a nonlinear function. It will be seen that in the construction of the present invention, the resistance of the brake pedal which has to be overcome by the foot of the driver, is always proportionate to the braking force applied by the power piston, so that the actual braking force is clearly indicated to the driver who can accordingly reduce or increase the foot pressure on the brake pedal.

In the event that the pressure generating means of the engine should fail, for example if the engine stalls, the operator depresses brake pedal 2, and displaces valve member 3 against the action of spring 19 until flange 302 of valve member 3 abuts the central portion of power piston 15 whereupon muscular force applied by the operator displaces power piston 15 against the action of spring 16. Piston rod 18 of the master piston in master cylinder 25 is displaced, and the hydraulic brakes 28 are actuated by the operator without the assistance of the power piston 15.

It will be seen that the power brake arrangement of the present invention will become effective almost immediately after actuation of the brake pedal, whereupon the force applied by power piston 15 to the brakes is immediately indicated to the operator by a reaction force acting through the brake pedal on the foot of the driver. Whenever the driver applies a selected force to the brake pedal, a multiple of this force is applied to the brake so that the driver can exactly measure the brake effect in all road situations, even if the transmission ratio between the pedal pressure and the force applied by the power piston is very great. Since the indication of the applied brake force is produced by the same pressure differential between power piston 15 and reaction piston 11 which produces the power for operating the brake, the indication at the brake pedal takes place almost immediately. Consequently, dead periods in the operation are reduced to a minimum, since there are no irregularities of the graph indicating the ratio of the forces and since the brake effect is always in the same ratio to the force applied by the driver. Due to this fact, the time between the first application of a force to the brake pedal to the application of the maximum brake force on the brake cylinders, can be reduced by the apparatus of the invention to 40 milliseconds, as compared with the minimum of 280 milliseconds required by power brakes according to the prior art.

It will be understood that each of the elements described above, or two or more together, may also find a useful application in other types of power booster arrangements differing from the types described above.

While the invention has been illustrated and described as embodied in a power brake arrangement in which a reaction piston produces on the brake pedal a reaction force depending in accordance with a linear function on the actually applied brake force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. Power booster arrangement comprising, in combination, cylinder means having walls; power piston means in said cylinder means forming at one end of the same a first negative pressure chamber; a device including a member located at said one end of said cylinder means connected with said power piston means so that said device is operated by the same; reaction piston means located in said cylinder means on the side of said power piston means remote from said device and forming with a wall of said cylinder means at the other end of said cylinder means a second negative pressure chamber, and forming with said power piston means a variable pressure chamber; said cylinder means including a cylinder and a flexible membrane extending transversely across said cylinder and having an outer annular portion attached to, and supporting the periphery of said power piston means, and an inner portion attached to, and supporting said reaction piston means spaced from said power piston means, said wall of said cylinder means stationarily supporting an annular portion of said membrane located between said outer and inner portions of the same and partly bounding said variable pressure chamber; means for producing negative pressure in said first and second negative pressure chambers; operator controlled means connected with said reaction piston means; valve means operated by said operator controlled means and having a normal inoperative position for connecting said variable pressure chamber with one of said negative pressure chambers, and an operative position for changing the pressure in said variable pressure chamber to positive pressure so that a pressure differential is created on opposite sides of each of said piston means for urging the same apart in said cylinder means whereby said power piston means applies to said device a force for operating the same, and said reaction piston means applies to said operator controlled means a reaction force felt by the operator as an indication of the force applied by said power piston means to said device.

2. Power brake arrangement as claimed in claim 1 wherein said power piston means and said reaction piston means have a common axis; and wherein said reaction force is proportionate to said actuating force in accordance with a linear function.

3. Power brake arrangement as claimed in claim 1 wherein said cylinder means includes a casing to which said outer annular portion of said membrane is attached, and wherein said outer and intermediate annular portions of said membrane form annular folds unrolled by movement of said power piston means and said reaction piston means, respectively.

4. Power brake arrangement as claimed in claim 1 wherein said valve means includes means for first separating said first and second negative pressure chambers from said variable pressure chamber during movement of said valve means toward said operative position and for then connecting said variable pressure chamber with the atmospheric air.

5. Power brake arrangement as claimed in claim 1 wherein said power piston means has a greater diameter than said reaction piston means; wherein said cylinder means includes a first wall means forming with said power piston means a cylinder space, and a second wall means including said wall forming with said reaction piston means said second negative pressure chamber and with an annular portion of said power piston means and said first wall means another variable pressure chamber communicating with said first mentioned variable pressure chamber; comprising spring means between said power piston means and said operator controlled valve member holding said power piston means spaced from said valve member whereby in the event that said power piston means is not operated by a pressure differential upon movement of said operator controlled valve member in said one direction, said spring means is compressed and the unit formed by said valve member and said reaction piston means abuts said power piston means whereby said brake means is operated by the muscular force of the operator.

6. Power brake arrangement comprising, in combination, cylinder means having walls; suction generating means connected with said cylinder means; power piston means in said cylinder means forming with one end of the same a first negative pressure chamber communicating with said suction generating means; brake means connected with said power piston means so as to be operated when the same moves in one direction into said first negative pressure chamber; reaction piston means located in said cylinder means and forming with a wall of the same at the other end of said cylinder means a second negative pressure chamber communicating with said suction creating means, and forming with said power piston means a variable pressure chamber; valve means mounted on said cylinder means and including an operator controlled valve member connected with said reaction piston means for movement therewith, a fixed valve housing in which said valve member is mounted for sliding movement, and an elastic sealing ring between said valve member and said valve housing and having an annular portion opposite said reaction piston means and forming a buffer for said reaction piston means; spring means between said power piston means and said operator controlled valve member holding said power piston means spaced apart from said valve member; and operator controlled means for moving said valve member between a normal inoperative position in which said variable pressure chamber is connected with one of said negative pressure chambers, and an operative open position for connecting said variable pressure chamber with atmospheric air so that atmospheric pressure in said variable pressure chamber exerts on said power piston means an actuating force in said one direction for operating said brake means, and exerts on said reaction piston means a reaction force acting on said valve member and said operator controlled means opposite to said one direction and depending on the brake force exerted by said brake means whereby said reaction force is transmitted to the operator as an indication of the actual brake force.